US006937283B1

United States Patent
Kessler et al.

(10) Patent No.: US 6,937,283 B1
(45) Date of Patent: Aug. 30, 2005

(54) ANTI-ALIASING LOW-PASS BLUR FILTER FOR REDUCING ARTIFACTS IN IMAGING APPARATUS

(75) Inventors: David Kessler, Rochester, NY (US);
Alan C. G. Nutt, Rochester, NY (US);
Russell J. Palum, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/770,381

(22) Filed: Dec. 3, 1996

(51) Int. Cl.⁷ ............................................. H04N 5/225
(52) U.S. Cl. ..................................... 348/342; 348/335
(58) Field of Search .................... 348/331, 335–342, 348/343, 344, 338; 359/494, 495, 497, 498, 499

(56) References Cited

U.S. PATENT DOCUMENTS

| | | | |
|---|---|---|---|
| 3,784,734 A | * 1/1974 | Watanabe et al. ............ 178/5.4 |
| 3,971,065 A | 7/1976 | Bayer ........................... 358/44 |
| 4,101,929 A | 7/1978 | Ohneda et al. ............... 358/44 |
| 4,575,193 A | 3/1986 | Greivenkamp, Jr. |
| 4,626,897 A | * 12/1986 | Sato et al. .................... 358/44 |
| 4,896,217 A | 1/1990 | Miyazawa et al. ..... 358/213.11 |
| 4,989,959 A | 2/1991 | Plummer .................... 350/447 |
| 4,998,800 A | 3/1991 | Nishida et al. .......... 350/162.2 |
| 5,317,655 A | * 5/1994 | Pan ............................. 385/11 |
| 5,322,998 A | 6/1994 | Jackson ...................... 250/216 |
| 5,438,366 A | 8/1995 | Jackson et al. ............. 348/342 |
| 5,452,129 A | * 9/1995 | Shiraishi ..................... 359/497 |
| 5,471,343 A | * 11/1995 | Takasugi .................... 359/494 |
| 5,477,381 A | * 12/1995 | Sasaki et al. ............... 359/497 |
| 5,557,692 A | * 9/1996 | Pan et al. .................... 385/11 |
| 5,579,420 A | * 11/1996 | Fukushima .................. 385/11 |
| 5,646,399 A | * 7/1997 | Fukushima et al. ......... 250/226 |
| 5,684,293 A | * 11/1997 | Kessler .................... 250/208.1 |
| 5,715,085 A | * 2/1998 | Takatori et al. ............. 359/495 |
| 5,777,419 A | * 7/1998 | Penunuri ................ 310/313 A |
| 5,850,284 A | * 12/1998 | Schoeffler et al. .......... 356/369 |
| 5,982,539 A | * 11/1999 | Shirasaki ..................... 359/497 |

* cited by examiner

Primary Examiner—Wendy R. Garber
Assistant Examiner—Jacqueline Wilson
(74) Attorney, Agent, or Firm—Nelson Adrian Blish

(57) ABSTRACT

An imaging apparatus (50) for generating an image signal from incident light with higher spatial frequencies of the incident light limited to reduce undersampling artifacts. Apparatus (50) includes a detector plane (62) for generating the image signal from an array of photosites, (63) and an optical section having a relatively thin lithium niobate rhomboidal filter (51) interposed in the path of the incident light so as to produce a blurred image on the photosites. A filter configuration is disclosed which produces four spots (58) at the imaging sensors (62) positioned at the corners of a rhombus.

1 Claim, 4 Drawing Sheets

ANTI-ALIASING LOW-PASS BLUR FILTER FOR REDUCING ARTIFACTS IN IMAGING APPARATUS

BACKGROUND OF THE INVENTION

1. Technical Field

The present invention pertains to a low-pass optical filter used in an electronic imaging system to reduce aliasing or undersampling artifacts.

2. Background Art

An electronic imaging system typically produces a signal output corresponding to a viewed object by spatially sampling an image of the object in a regular pattern with an array of photosensitive elements, such as, for example, a charge-coupled device (CCD) solid-state image sensor. In such an imaging system, it is well-known that components in the object which contain fine details create frequencies too high to be analyzed within the sampling interval of the sensor and contribute to the amplitudes of lower frequency components, thereby produce imaging errors commonly referred to as aliasing or undersampling artifacts. In particular, if the spatial detail being imaged contains a high frequency component of a periodicity smaller than the pitch of the photosensitive picture elements of the solid state image sensor, the subsequent detection of this high frequency component tends to result in a spurious signal due to aliasing.

In general, the electronic imaging system can minimize aliasing if its optical section has a frequency response that cuts off, or filters out, the higher frequency content of the object being imaged. As a result, the optical section generally employs an optical low pass filter to substantially reduce the high frequency component contained in the spatial detail of the image received by the image sensor. Thus, prior art design of electronic imaging systems involves a trade-off between image sharpness and the susceptibility of the imaging system to aliasing distortions or undersampling artifacts.

To limit these artifacts, an optical filter, for example, a birefringent blur filter, has become a common component in consumer color video cameras. U.S. Pat. Nos. 4,101,929 and 4,896,217 show typical examples of such filters. Such a filter is usually placed between a lens and the image sensor to provide a low-pass filter function which reduces the spatial frequency content of the object at frequencies above the Nyquist frequency of the photosensitive elements. This makes the imaging system less susceptible to aliasing distortion. For example, for sensors which have equal pixel densities in each of the sensed colors, thus each of the sensed colors have the same Nyquist frequency, an achromatic low-pass, or "blur," function is effective in minimizing aliasing distortion. Such a function can readily be provided by a birefringent filter.

The birefringent blur filter is typically composed of filter plates manufactured from a crystalline material like quartz that exhibits a dual refraction effect when the crystal axes of the filter plates are oriented at an angle with respect to the plate surface. In this orientation, a randomly polarized ray of light passing through such a filter plate emerges as two separated polarized rays. The combination of several of such plates produces a multiple spot pattern from each incident point in the image. If this spot pattern distributes light energy over multiple photosensitive elements, then the blur effect is obtained. This will limit the optical transfer function of the system at spatial frequencies above the Nyquist frequency of the photosensitive elements.

One of the most common blur filters in the prior art is the four spot filter made of crystal quartz plates. Quartz is a uniaxial crystal, namely, it has one unique direction called the crystal optical axis so that when light propagates along this so called ordinary direction, the index of refraction for all polarization directions is the same and it is designated "$N_o$." For light propagating perpendicularly to this axis, the so called extraordinary direction, the index of refraction is "$N_e$." If a crystal 10 is cut as shown in FIG. 1, so that the crystal optical axis 12 is at an angle α to a line normal to the input facet 14, then an incoming unpolarized ray 16 will be split into two rays. This is known as double refraction. One ray will continue unaffected and is called the ordinary ray 17. The other ray, called the extraordinary ray 18, will emerge from the crystal displaced from the ordinary ray. The separation between the rays is given by:

$$S = t*(N_o^2 - N_e^2)*\mathrm{Tan}(\alpha)/(N_o^2 + N_e^2*\mathrm{Tan}^2(\alpha)) \qquad \text{Equation 1:}$$

$N_o$ is the ordinary index of refraction
$N_e$ is the extraordinary index
For crystal quartz at 546 nm:
  No=1.5462 and Ne=1.5554
t is the plate thickness
α is the angle between the crystal optical axis and the normal to the surface of the plate Maximum separation (S) occurs when the angle α is about 45°.

One way of making a four spot filter 20 is by using two crystal quartz plates 21 and 23, double refractors, as shown in FIG. 2, with a quarter wave retarder 22 between them. A similar four spot filter is suggested by Sato in U.S. Pat. No. 4,626,897. FIG. 2 shows the three pieces separated, but ordinarily, they are cemented together. The first double refractor 21 separates the beam into two beams with, for example, a separation in the vertical direction. The retarder 22 converts the two linearly polarized beams 17 and 18 into circularly polarized beams 27 and 28 which are then split in the horizontal direction by the second double refractor 23.

Using Equation 1, if the pitch of a given CCD detector size is 9 μm, the preferred separation S for a square four spot filter is equal to 9 μm. Substituting S=0.009 mm in the equation above, the required plate thickness t for the two double refractors is 3.04 mm. (This does not include the thickness of the retarder in between). This large thickness of 3.04 mm is due to the small birefringence, namely the small difference between the indices of the crystal quartz, $N_o - N_e =$ 0.0092.

FIG. 3a shows another way of producing a square, four spot blur filter 30 according to the prior art. In this case, a first double refractor 21 is used as in FIG. 2 to separate the spots, for example in the vertical direction, as shown in FIG. 3b. This shows the spots at a detector plane 24 when only the first double refractor 21 is used. Referring again to FIG. 3a, the second double refractor 33 has a crystal axis in a plane 33a tilted at 45°. The thickness of the second double refractor 33, $t_2$ is smaller than the thickness of the first double refractor, $t_2=0.707t_1$. FIG. 3c shows spots that would be produced by the two beams at the detector plane 24 and their polarization in the coordinate system of the second double refractor. The second double refractor 33 splits each of the spots as shown in FIG. 3d at the detector plane.

Referring again to FIG. 3a, the third double refractor 36 has a plane 36a at 90° to the plane 33a of the second double refractor 33, and has the same thickness as the second double refractor. The third double refractor splits the beam again and a square pattern is achieved as is shown in FIG. 3e. The double refractors are cemented together to reduce reflection losses. The filter assembly is aligned so the square pattern is parallel to the coordinates of the CCD which comprise an image sensor located at detector plane 24.

The filters discussed above, however, suffer from the drawback that the thickness required to achieve the desired blur requires a lens with a long, back focal distance in order to make room for the blur filter in the optical path. Space limitations often do not allow such an optical structure, and lens design becomes unduly complicated. In most digital cameras, space is at premium and there is no room for a thick filter. For example, in cameras using a flipping mirror, the space in front of the detectors is needed for the mirror assembly. Also, when a digital camera which was originally designed as film camera is modified for use with a CCD detector, in addition to the mechanical problems associated with accommodating a thick blur filter, a lens designed for film may not perform as well with a thick filter, which may introduce aberrations. In these cases, a thinner filter is useful, which may fit the space constraints and will introduce less aberrations than a thick filter.

Another problem with current art four spot filters is that they are commonly made of three pieces, either two double refractors and a retarder as in the Sato, U.S. Pat. No. 4,626,897; or as in FIG. 3a, which uses three double refractor plates without a retarder. A filter made of two elements would be less complex and less expensive. Watanabe U.S. Pat. No. 3,784,734 proposed a blur filter made of two double refractors for color image pickup using a striped filter array. Watanabe only needed to split the image spot into three or four spots along one direction, perpendicular to the stripes direction. In most modern CCD images, a color filter array used is commonly a two-dimensional array of color filters as in Bayer U.S. Pat. No. 3,971,065, and a blur filter is required to split the imaging spot into four or more spots arranged in a two-dimensional pattern, so the Watanabe design would not be satisfactory.

It is also well known in the art to use a phase diffraction grating as a frequency selective filter to produce an image blur. For example, as shown in U.S. Pat. No. 4,998,800, the periodicity of an image of a diffraction grating projected onto a solid state image sensor is selected to be a multiple of the periodicity of the photosensitive picture elements, and a blurred image is obtained. This type of filter, however, suffers from the drawback that, instead of producing a tightly controlled pattern over a few photosensitive elements, it spreads light over many interference fringes (orders) theoretically out to infinity. In addition, it is difficult to control the energy distribution in the fringes in order to obtain an acceptable blur function covering a designated number of pixels. Moreover, the energy distribution is dependent upon wavelength.

As can be appreciated from the foregoing remarks, there is a need in the art for a physically thin blur filter that is inexpensive and relatively simple to manufacture, yet which produces a tightly controlled blur pattern that is not dependent upon polarization techniques. As an alternative to the birefringent blur filter and the phase diffraction grating, U.S. Pat. No. 4,989,959 discloses a pyramidal structure comprised of four wedges which divide incident light into four quadrants so that light from the same image point impinges, on the average, on several photosensitive elements in the image sensing device. To produce four abutting facets at identical angles on a single piece of material, one facet would ordinarily be machined or ground into a single piece of material, the piece would then be cut into sections, and the sections glued together to form a piece shaped like a pyramid. This filter produces the desired spots at the CCD plane when the lens is at focus, however, as the lens is slightly defocused, the spots tend to blend and the anti-aliasing efficiency is diminished. Further, this anti-aliasing filter is positioned at the lens pupil (or at the exit or entrance pupil); not in proximity to the imager. By placing the filter at the pupil, an auto focusing system, if present, may be confused. Also, the lens has to be designed to accommodate such placement of the filter. Since the filter is focal length dependent, it will not work with a zoom lens.

Commonly assigned U.S. Pat. Nos. 5,322,998 and 5,438,366 disclose a conical blur filter that reduces undersampling artifacts by generating a blurred image produced by limiting higher spatial frequencies of incident image light. The blurred image takes the form of a circular blur pattern, for each input point source. Depending upon the shape of the filter, the circular blur pattern may be an annular blur pattern covering a two-dimensional array of photosites, or the central part of the pattern may be filled in with blurred light. Although this is a very good filter if there is ready access to the pupil, it too is located at the aperture and may confuse an auto focus system, if there is one, and will not work with a zoom system.

SUMMARY

It is therefore an object of the present invention to provide a physically thin blur filter that is inexpensive and relatively simple to manufacture, yet which produces a tightly controlled blur pattern that is not dependent upon polarization techniques.

The aforementioned problems are solved according to a feature of the present invention by the use of an imaging apparatus for generating an image signal from incident image light having its higher spatial frequencies limited to reduce undersampling artifacts. The apparatus includes an image sensor for generating the image signal from an array of photosites, and an optical section having a highly birefringent uniaxial crystal optical filter, such as lithium niobate, interposed in the path of the incident image light so as to produce a blurred image on the photosites.

According to another feature of the invention a four spot filter is made by using two plates made of highly birefringent crystal such as lithium niobate as double refractors with a quarter wave retarder between them. The three pieces are commonly cemented together. The first double refractor separates the beam into two linearly polarized beams with for example, separation in the vertical direction. The retarder converts the two linearly polarized beams into circularly polarized beams which are then split in the horizontal direction by the second double refractor. For a spot separation of 9 µm, a filter made according to the present invention is only 0.46 mm thick compared with the 3.04 mm thickness of the prior art filter using crystal quartz. Calcite can also be used, however calcite is very hard to grind and polish. Lithium niobate on the other hand has a large birefringent and can easily be ground and polished. Within the context of the present invention, the crystal optical filter can also be made from Lithium Tantalate.

Another aspect of the current invention is a rhomboidal four spot blur filter which uses a total of only two plates with their optical axis at 45° to each other. The filter is rotated about the camera axis to efficiently reduce aliasing artifacts. Reducing the number of components in the filter reduces the cost of the filter and the cost of cementing since only one cementing operation is needed per filter instead of two.

BRIEF DESCRIPTION OF THE DRAWINGS

FIGS. 3b-3e are plan views of spots produced at a detector plane by the various components of FIG. 3a.

DETAILED DESCRIPTION OF THE INVENTION

The present description is directed in particular to elements forming part of an apparatus in accordance with the present invention. It is to be understood that elements not specifically shown or described may take various forms well known to those skilled in the art. For instance, geometrical relationships of the optical components are not shown or described in detail, except where necessary to describe the invention. Moreover, relative sizings of components shown in the figures are not meant to be taken to scale, since the necessary geometrical relationships and sizings can be readily discerned by one of ordinary skill in this art.

Figures 3A, 4:
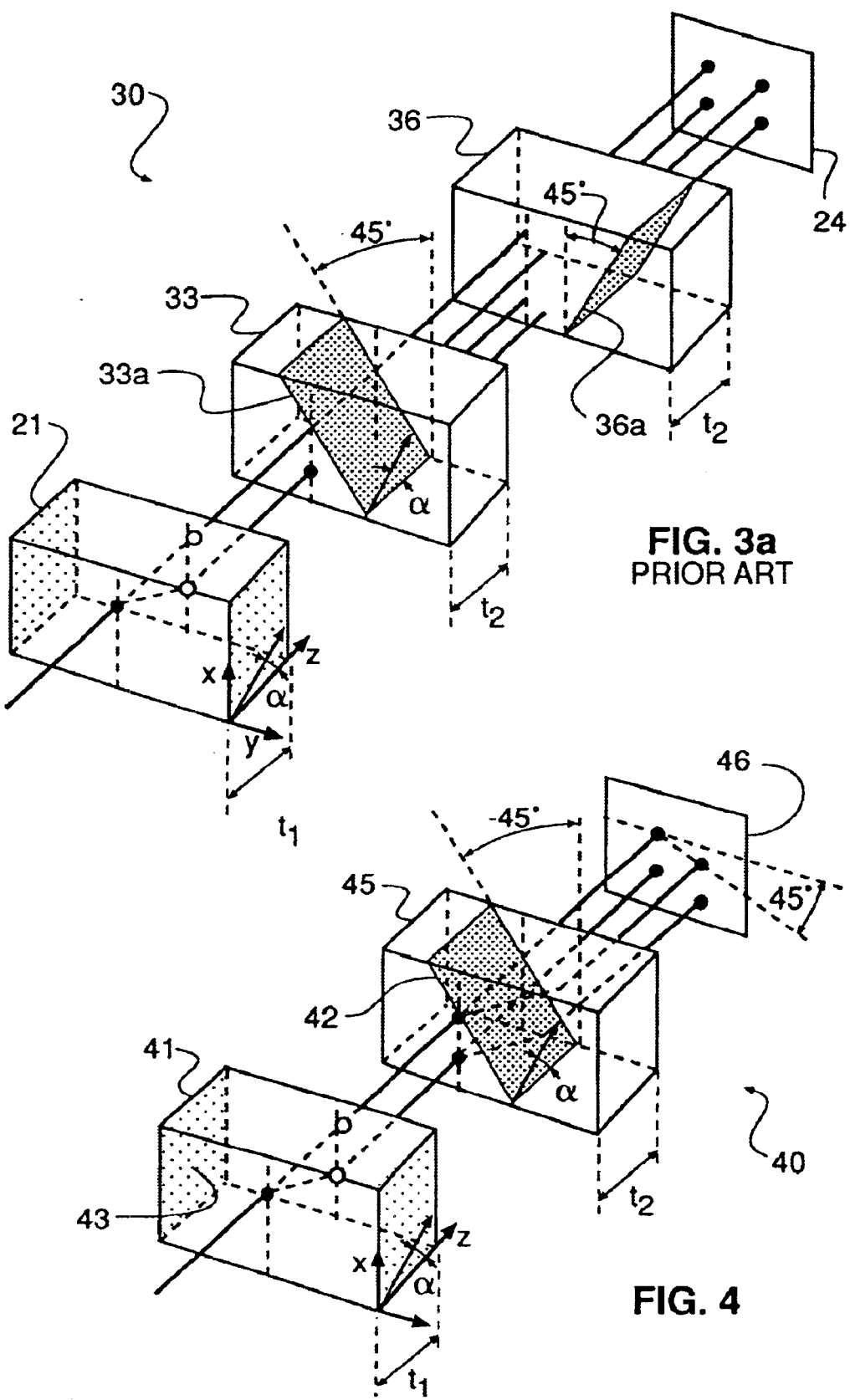
FIG. 3a is a perspective view of another four-spot filter according to the prior art using three double refractors.
FIG. 4 shows a perspective view of a rhomboidal four-spot filter made of two double refractor according to the present invention.
Figure 3B:
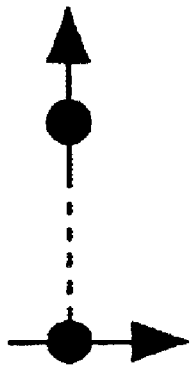
Figure 3C:
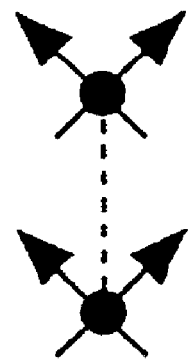
Figure 3D:
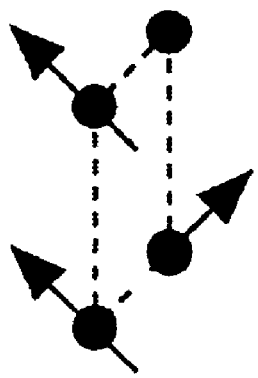
Figure 3E:
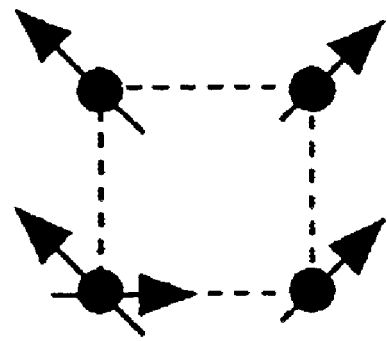

Referring to FIG. 4, the preferred embodiment of a blur filter, referred to in general by numeral 40, according to the present invention is shown. A first double refractor 41 produces polarized light at each of the two spots. A second double refractor 45 has a plane 42, that is tilted at 45° to a first plane 43. The polarized light beam created by the first double refractor 41, will be essentially unpolarized in the coordinate system of the second double refractor 45. The thickness of the two plates is the same, namely $t_1=t_2$. In this case the four spots at the detector plane 46 form the shape of a rhombus, namely a parallelogram with equal sides. When the thickness of the two double refractors are not equal, namely $t_1 \ne t_2$, the four spots form a rhomboid at the dector plane, namely a parallelogram with equal opposite sides.

In the preferred embodiment the double refractors are made of a highly birefringent uniaxial crystal material such as lithium niobate. The birefringence of lithium niobate is 0.09, however, any uniaxial crystal material having a birefringence of greater than 0.05 falls within the scope of this invention. The birefringence of crystal quartz is only 0.009. The large birefringence of the lithium niobate is used to minimize the thickness of the blur filter. For CCD detector with pixels pitch of 9 $\mu$m, the preferred separation is about 11 $\mu$m (s=11 $\mu$m). Using Equation 1 we find that the thickness of each of the double refractors is $t_1=t_2=0.29$ mm for a total thickness of 0.58 mm for the rhombus blur filter.

One problem in using lithium niobate is that the indices of refraction are about 2.3 and that there is no cement with such a high index. Thus it would be difficult to easily cement two pieces of lithium niobate without reflection losses due to refractive index mismatch. There are at least two solutions for this problem. One is to precoat the lithium niobate surfaces to be cemented with an anti-reflection coating designed specifically for the chosen cement and the lithium niobate interface. Another solution is to keep the lithium niobate pieces separated by a small gap and coat the lithium niobate surfaces with an anti-reflection coating designed for air-to-lithium niobate interface.

Figure 2:
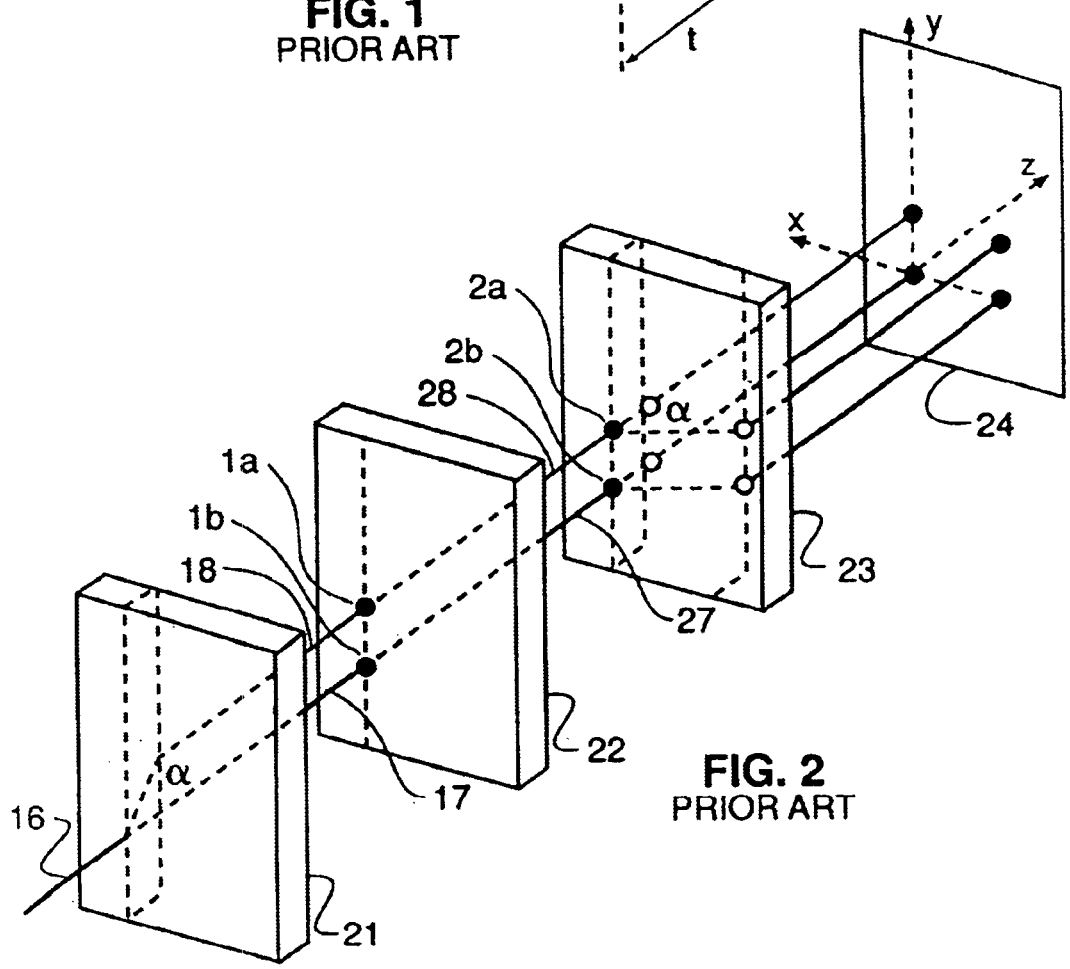
FIG. 2 is a perspective view of a square, four-spot blur filter according to the prior art using two double refractors and a retarder.

In another embodiment, four spot filters are used as in the prior art in FIGS. 2 and 3 however, the crystal is changed from crystal quartz to lithium niobate so as to substantially reduce the thickness of the filter. As explained before, a 9 $\mu$m four spot filter, the thickness will change from 3.04 mm for crystal quartz to 0.46 mm for lithium niobate. (The retarder thickness is not included in either case.)

For the four spot filter depicted in FIGS. 3a-3e, with the sides equal to 9 $\mu$m, the thickness of a filter made of crystal quartz according to the prior art is 1.52 mm for the first piece and 0.707*1.52=1.07 mm for each of the two other pieces for a total of 3.66 mm. The same filter made with lithium niobate will have a thickness of 0.23 mm for the first piece and 0.707*0.23=0.17 mm for each of the two other pieces for a total of 0.55 mm.

Figure 5:
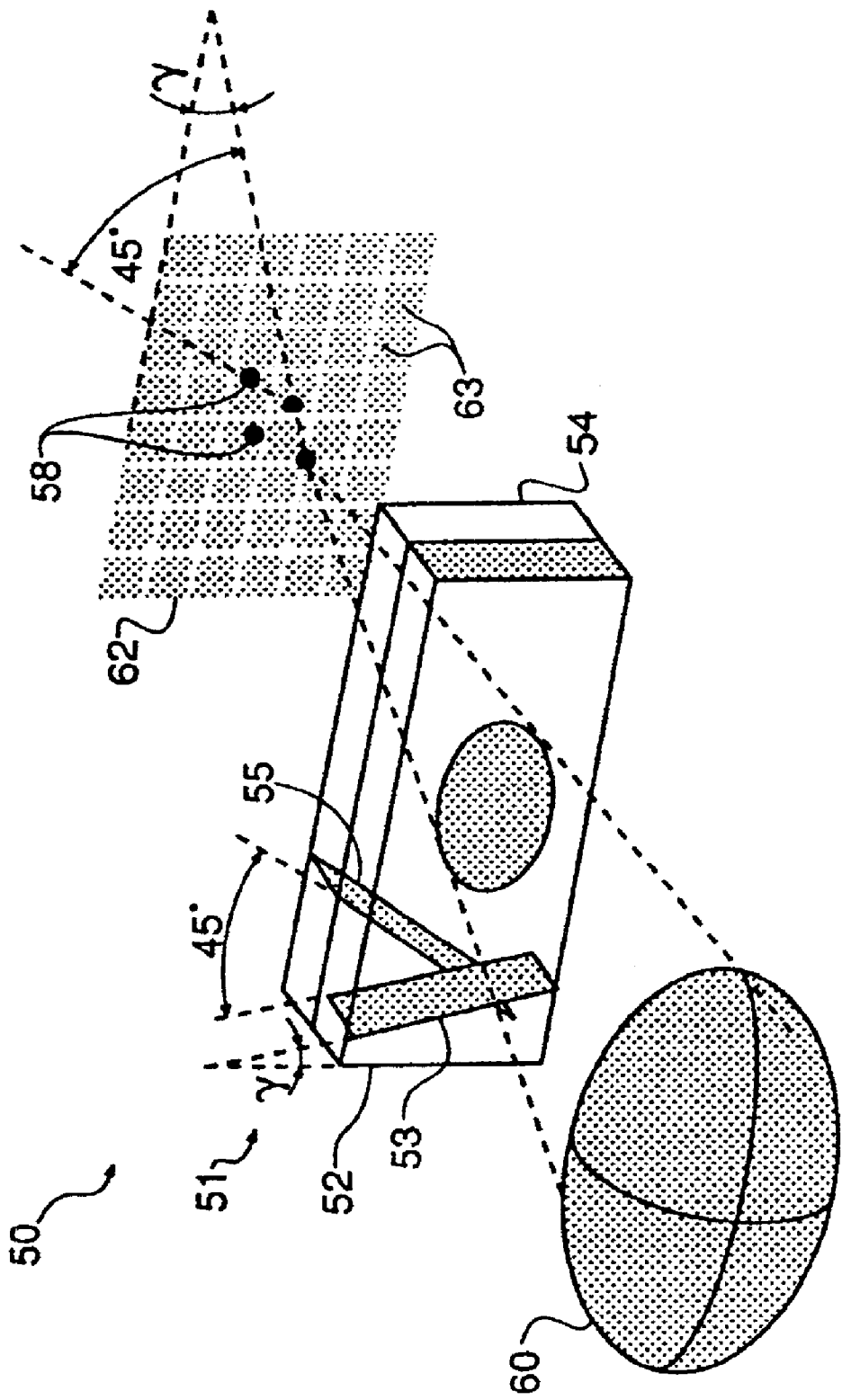
FIG. 5 shows a perspective, schematic view of a rhomboidal blur filter, rotated about an optical axis of a CCD camera so that an angle b is formed between the major axis of the rhomboid and the major coordinates of the CCD detector.

Another embodiment of the present invention, imaging apparatus 50, is shown in FIG. 5, where a two piece rhomboidal filter 51 comprised of a first retarder 52 and a second retarder 54, shown in a CCD camera is rotated about an optical axis of a camera to further reduce aliasing, so that an angle γ is formed between the rhomboid base and the major coordinates of the CCD detector. The preferred angle γ is 30° but values of γ between 20° to 40° are suitable. Spots 58 are produced at detector plane 62 comprised of photosites 63. A lens 60 focuses the desired image.

Figure 1:
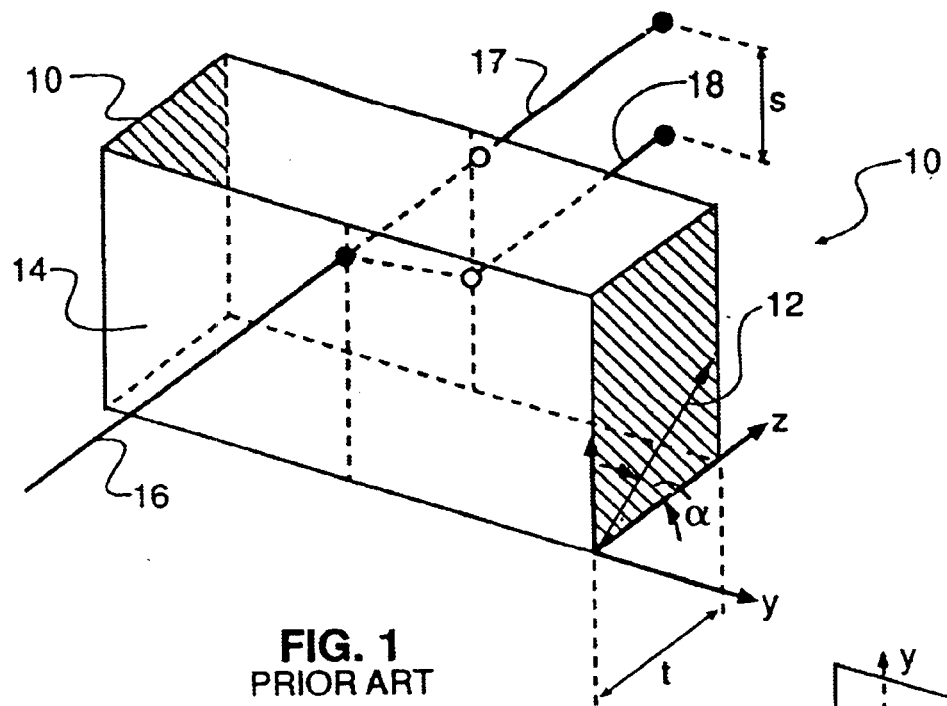
FIG. 1 is a perspective view of a prior art double refractor splitting an unpolarized beam into two displaced beams.

Lithium niobate crystals are not found in nature. They are commonly grown from melt using the Czochraski pulling method and commonly form boules 4 inch or 3 inch diameter with the crystal optical axis (the z axis) aligned along the axis of symmetry of the boule. In yet another embodiment according to the present invention, the optical axis of α a lithium niobate crystal as shown in FIGS. 1 and 4 is chosen to be 37.85° instead of 45°. This angle is chosen to align the retarder plane with a major principal crystal direction called the 10.4 direction or the "127.85° Y cut" by crystal growers. It is possible to grow the boule along this direction so that its axis of symmetry aligns with this direction and thus the crystal axis already forms the angle α with the boule axis of symmetry so that wafers cut from the boule already have the crystal axis at the desired angle α with the plates surfaces as shown in FIG. 1 without having to cut the boule at an angle to its axis of symmetry. This simplifies the production of lithium niobate double refractors and reduces their cost. The change of the angle from 45° to 37.85° increases the needed thickness according to Equation 1 by a small amount compared with a similar filter oriented at 45°. For example a rhombic filter with 11 $\mu$m size sides is 0.29 mm instead of 0.23, so the total filter thickness is 0.58 mm instead of 0.46 mm for the 45° design.

The invention has been described in detail with particular reference to preferred embodiments thereof, but it will be understood that variations and modifications can be effected within the spirit and scope of the invention.

| Parts List | |
|---|---|
| 10 | Crystal |
| 12 | Crystal optical axis |
| 14 | Input facet |
| 16 | Unpolarized ray |
| 17 | Ordinary ray |
| 18 | Extraordinary ray |
| 20 | Four spot filter |
| 21 | First double refractor |
| 22 | Quarter wave retarder |
| 23 | Second double refractor |
| 24 | Detector plane |
| 25a | Plane |
| 27 | Circularly polarized beams |
| 28 | Circularly polarized beams |
| 30 | Four spot blur filter |
| 33 | Second double refractor |
| 33a | Plane |
| 36 | Third double refractor |
| 36a | Plane |
| 40 | Blur filter |
| 41 | Double refractor |
| 42 | Plane |
| 43 | First plane |
| 45 | Double refractor |
| 46 | Detector plane |
| 50 | Imaging apparatus |
| 51 | Rhomboidal filter |
| 52 | First retarder |

-continued

Parts List

| | |
|---|---|
| 54 | Second retarder |
| 58 | Spots |
| 60 | Lens |
| 62 | Dector plane |
| 63 | Photosites |

What is claimed is:

1. An imaging apparatus for generating an image signal from incident light with higher spatial frequencies of said incident light limited to reduce undersampling artifacts, said apparatus comprising:

an image sensor for generating the image signal from an array of photosites;

an optical section having a spatial filter made of a highly birefringent uniaxial crystal selected from a group consisting of lithium niobate and lithium tantalate interposed in the path of the incident image light so as to produce at least four spots at a detector plane; and wherein said birefringent uniaxial crystal spatial filter is comprised of two double refractors, and said four spots form a rhomboidal pattern wherein a sharp angle of the rhomboid is 45° and wherein the spatial filter is rotated about an optical axis of the imaging apparatus such that a base of the rhomboidal pattern forms an angle with one of two major coordinates of the imaging apparatus of between 20° to 40°.

* * * * *